United States Patent

Mihalyi et al.

[15] 3,656,974

[45] Apr. 18, 1972

[54] POWER DRIVEN STIRRER

[72] Inventors: Richard F. Mihalyi, 1412 N. Havenhurst Drive, Hollywood, Calif. 90046; Yale R. Wexler, 9779 Oak Pass Road, Beverly Hills, Calif. 90212

[22] Filed: Nov. 28, 1969

[21] Appl. No.: 880,593

[52] U.S. Cl................................99/348, 259/108, 416/87, 416/142, 416/150, 416/244
[51] Int. Cl......................................A47j 43/07, B01f 7/18
[58] Field of Search..............416/87, 88, 89, 142, 160, 163, 416/164, 166, 205; 99/348, 352; 259/7, 8, 23, 24, 43, 44, 107, 108, 122, DIG. 38

[56] References Cited

UNITED STATES PATENTS

| | | | |
|---|---|---|---|
| 2,027,297 | 1/1936 | Tramposch | 259/DIG. 38 |
| 2,130,542 | 9/1938 | Giddings | 259/DIG. 38 |
| 2,219,517 | 10/1940 | Cowles | 259/107 |
| 2,681,211 | 6/1954 | Reynolds | 99/348 X |
| 2,805,843 | 9/1957 | Block | 259/108 |
| 3,357,685 | 12/1967 | Stephens | 99/348 X |

FOREIGN PATENTS OR APPLICATIONS 265,073    2/1927    Great Britain........................259/107

Primary Examiner—Edward L. Roberts
Assistant Examiner—Philip R. Coe
Attorney—Herzig & Walsh

[57] ABSTRACT

The device is a power driven stirrer particularly for food products in a vessel having a source of heat under it. The device provides an impeller or mixer which is rotated relatively slowly by a motor that is battery driven to avoid cords and any possibility of shocks resulting from shorts. The motor and the impeller are suspended in the manner of a pendulum over the vessel with adjustments provided to vary the height of suspension and the position of suspension so that the impeller can be centered in the vessel. The motor and impeller are supported from a bracket support attachable to the periphery of the vessel in which mixing is to take place.

5 Claims, 10 Drawing Figures

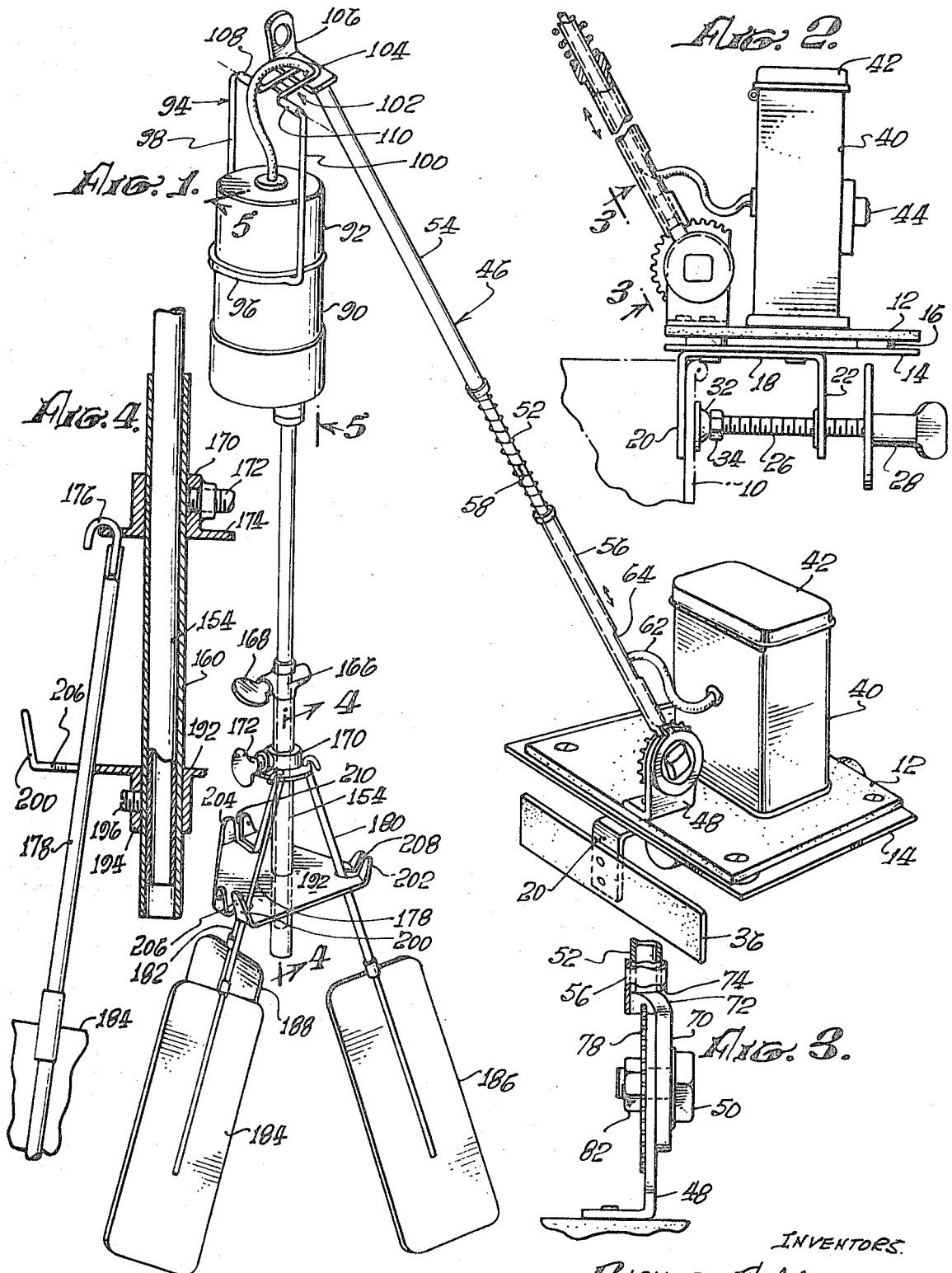

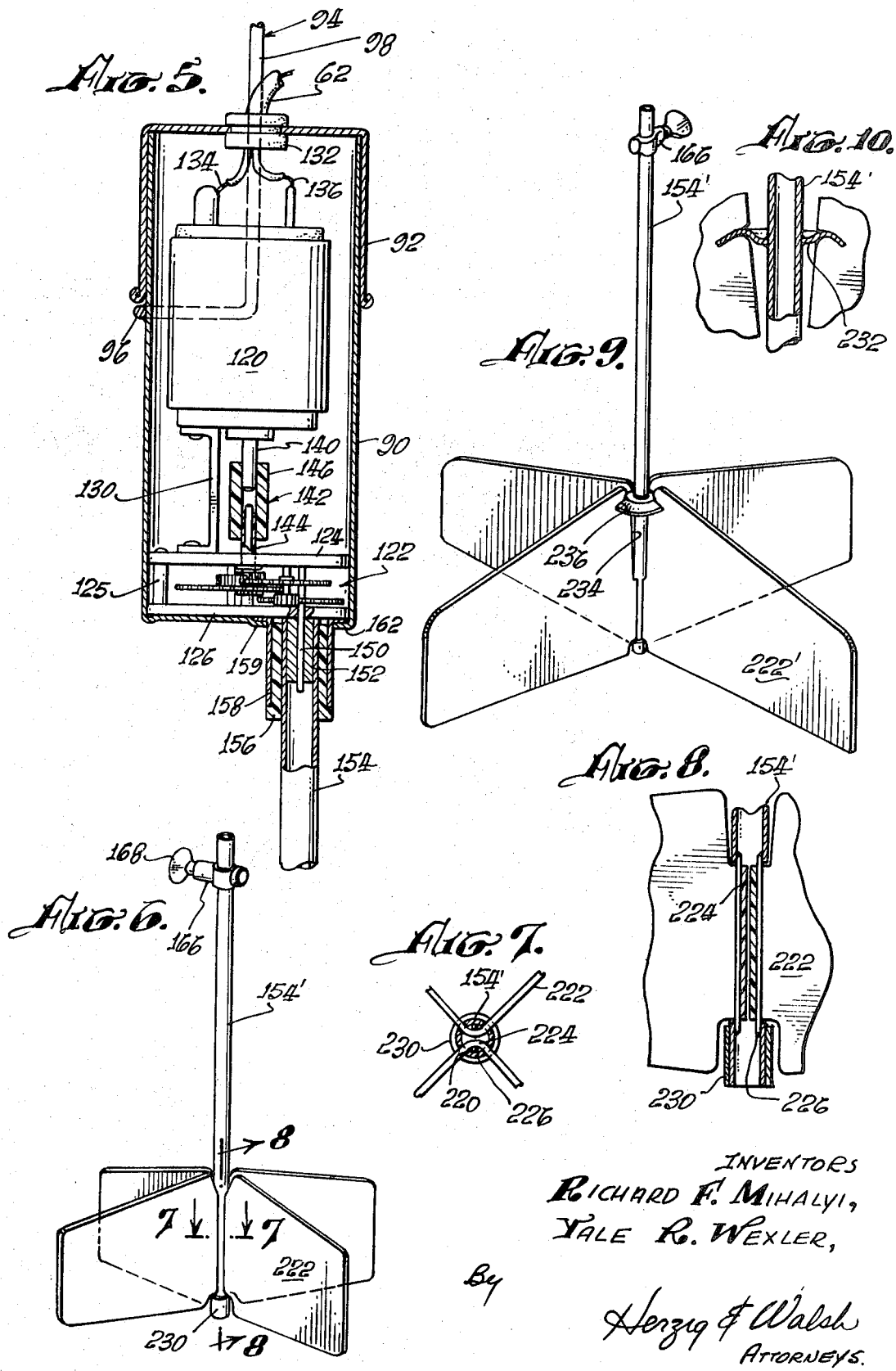

POWER DRIVEN STIRRER

SUMMARY OF THE INVENTION

The invention is a power driven stirrer particularly adapted for stirring food products in a vessel which may have a source of heat under it. There is need for an effective product of this type to avoid difficulty and tedious work involved in manually stirring a product.

In a preferred form of the invention it provides a power driven stirrer driven by a miniature DC motor and powered by batteries, incorporated as a part of the assembly. Thus there is no extension cord and there is no danger of shocks resulting from shorts. Support means are provided attachable to the peripheral edge of a vessel in which stirring is to take place with an angularly adjustable stem from which the motor and impeller are suspended in the manner of a pendulum. The impeller is vertically adjustable and thus adjustments are provided for readily centering the impeller with respect to the vessel and adjusting it for height so that it mixes at the correct depth. Preferably the impeller is articulated and is adjustable to vary the circumferential area in which mixing takes place.

The primary object of the invention is to make available a stirrer of the type referred to having an impeller which operates at relatively low speed and which is easily adjustable to provide for centering of the impeller in a vessel and for adjusting the depth of immersion of the impeller in a vessel.

A further object is to provide a device as referred to in the foregoing object in which the impeller is driven by a DC motor which is battery powered to avoid any possibility of shocks from shorts of the like.

Another object is to provide improved impeller means in a device of the type referred to wherein the impeller means is adjustable vertically, and is articulated to provide for variation in the circumferential area swept through by the impeller blades. A corollary object is to provide impeller blades made of a flexible material to avoid any damage resulting from contact with the vessel in which mixing is taking place, and to allow contact of the blades with surfaces without stalling the motor.

Further objects and additional advantages of the invention will become apparent from the following detailed description and annexed drawings wherein:

FIG. 1 is a perspective view of a preferred form of the invention;

FIG. 2 is an elevational view of the mounting means for the stirrer;

FIG. 3 is a sectional view taken along the line 3—3 of FIG. 2;

FIG. 4 is a sectional view taken along the line 4—4 of FIG. 1;

FIG. 5 is a sectional view taken along the line 5—5 of FIG. 1;

FIG. 6 is a detail view of a modified form of impeller;

FIG. 7 is a sectional view taken along the line 7—7 of FIG. 6;

FIG. 8 is a sectional view taken along the line 8—8 of FIG. 6;

FIG. 9 is a view of a modified form of impeller;

FIG. 10 is a sectional view of part of FIG. 9.

FIGS. 1 and 2 show the stirrer and the manner of a support from a container, in which something is to be stirred. The container is designated at 10. The mixing device mounts on a base 12 which is preferably made of heat-resistant material, such as asbestos, which is spaced from a metal base plate 14 by way of spacers as shown at 16. Attached to the base 14 is a U-shaped bracket 18, having legs 20 and 22. Extending through an opening in the leg 22 is threaded stem 26 on the end of which is a fitting 28, having a disc and a thumb screw as shown, adapted for manual rotation of the stem. On the end of the stem 26 is a foot, or shoe, 32. The side wall of the container 10 can be engaged between the leg 20 and foot 32 and clamped therebetween to support the mixer from the edge of the container. Adjacent the foot 32 is a nut 34 on the stem 26 for purposes of clamping, the stem 26 also being threaded through the leg 22. Attached to the leg 22 is a strip 36 of flexible heat-resistant material serving as a fender, or buffer, to prevent the impeller elements from being obstructed by the leg 20, as will be described.

Mounted on the base 12 is a rectilinear battery container 40, having a hinged lid or cover 42. Preferably the drive motor is a DC motor, as will be described, and the batteries used are flashlight batteries. The circuit to the motor is controlled by a manual switch 44 on the case 40.

The drive motor and impeller are supported from a stem or jib 46, adjustably carried by the platform 12. Numeral 48 designates a bracket attached to the platform 12. The support comprises a rod 52, which is telescoped inside of a sleeve 54 and an adjustable sleeve 56, with a spring 58 between the sleeves. The rod 52 is tubular. Numeral 62 designates a small cable containing the wires for carrying power to the motor. This cable extends through a slot 64 in the side of the tube 56, and it extends into the tube 52 and through it and to the motor, as will be described.

Secured to the bracket 48 is a fitting 70 resembling a washer, having a lug 72 that fits in notch 74 at the end of the sleeve 56, and is rigid with the end of the rod 52. On the other side of the bracket 48 is a toothed wheel, or sprocket member 78, the member 70 and wheel 78 being secured to the bracket 48 by bolt 80 and nut 82. Wheel 78 is secured by a rivet to bracket 48. Member 70 rotates about a shoulder on bolt 80. As may be seen, the angular position of the support stem 46 may be readily adjusted. Normally, the end of the sleeve 56 fits between the teeth on the sprocket 78 to form a detent holding the stem 46 in position. The sleeve 56 may be reciprocated on stem 58 to disengage its end from teeth on the sprocket 78, allowing angular positioning of the stem 46, after which the sleeve 56 is reengaged with teeth on the wheel 78. Other forms of detents might be used.

The motor is a miniature DC motor carried within cylindrical housing 90, having a cylindrical top cover 92, as may be seen in FIG. 5. The motor housing is suspended by means of a support bracket 94 having an angular part 96, secured such as by welding or brazing to the housing 90 and having upright portions 98 and 100. See FIG. 1.

Numeral 102 designates a bracket support member having an extending part 104 that is brazed or soldered to an angle bracket 106 at the end of the sleeve 54. The part 104 has two transverse tubular extensions 108 and 110 and rotatably journalled in them are lateral extensions at the ends of the uprights 98 and 100. As may be seen, the motor housing 90 is suspended in the manner of a pendulum and can rotate or swing with respect to the journal bearings 108 and 110.

Referring to FIG. 5, the motor is shown at 120. Numeral 122 designates a reduction gear train mounted between spacer discs 124 and 126 in the lower part of the housing 90. The reduction gear train comprises typical gears arranged to produce an appropriate speed reduction from the speed of the motor to a relatively low rotational speed suitable for stirring.

The motor 120 is supported from disc 124 by way of bracket 130. The cable 62 extends into the housing 90 through the cover 92 by way of an insulated fitting 132, the leads being shown at 134 and 136.

The motor shaft is shown at 140 extending through a slip clutch 142, the output shaft from the slip clutch being shown at 144. The slip clutch preferably comprises simply a flexible vinyl sleeve 146 having friction fit on shaft 140 and a press fit on shaft 144, which is hardened, ground shaft.

Preferably the discs 124 and 126 are spaced by three posts 125.

The output shaft or stem of the gear train is designated at 150. About the shaft is bushing 152 having a forced fit in drive tube 154. Tube 154 rotates within Delrin bushing 156 which engages within tube 158, having a flange 160, preferably soldered or brazed to the disc of gear train 122, on the bottom of housing 90 having part 162 fitting over the flange 159.

FIGS. 1 and 4 show a preferred form of impeller and impeller mounting. Numeral 160 designates a mounting tube. At the upper end of this tube is a fitting 166 having a thumb screw 168 for vertically adjusting the position of the impeller on the drive tube. Adjustably positioned on the tube 160 is a fitting 170, having a thumb screw 172. Fitting 170 has a flange 174, having spaced apertures and hooked into these apertures are hooks such as shown at 176 at the ends of three rods 178, 180, and 182, which carry the impeller blades 184, 186, and 188 as shown.

Numeral 192 designates a spider having a bushing 194 slidable on the sleeve 160 and carrying set screw 196 for fixing it in position. The spider 192 is triangular as shown in FIG. 1, having upturned portions at its corners, as designated at 200, 202, and 204, these portions being slotted as shown at 206, 208, and 210, and the rods or stems 178, 180, and 182 fitting into these slots as shown, so that they have freedom to swing outwardly and radially. The blades might be formed of rigid, semi-rigid, or flexible material which is heat-resistant.

In the use of the stirrer, the support frame is mounted on the edge of a dish or vessel in which something is to be stirred, as illustrated in FIG. 2. The support stem or jib 46 can be adjusted angularly as described to position the motor housing 90 over the center of the vessel, so that the impeller blades can be centered, with respect to it. Then by loosening the wing nut 168, the impeller assembly can be vertically adjusted, depending upon the vertical dimension of the vessel and the depth of product to be stirred. By adjusting the fitting 170 and by loosening wing nut 172, this fitting can be adjusted relative to the spider 192 to thus vary the extent to which the blades are deployed radially. That is, a relatively small circumferential area may be stirred, or this area may be made greater by the adjustment as described.

By way of the gear train the impeller rotates at a relatively low speed suitable for stirring, and since the motor is battery-powered there is no danger of shocks to the user, the batteries being of low voltage and there being no extension cord. In the event the impeller is obstructed the slip clutch operates to allow the shaft 140 to slip without stalling the motor. As an alternative to the slip clutch, a thermal circuit-breaker might be used, whereby if the motor is stalled and begins to heat up, the circuit would be disconnected.

If the impeller assembly is not centered in the vessel so that the blades strike the side of the vessel, the pendulum assembly can swing to accommodate for such discrepancy and if desired the assembly can be suspended from a universal joint.

FIGS. 6, 7 and 8 illustrate a modified impeller assembly. The sleeve 154' is axially slotted, as illustrated at 220 in FIG. 7. The impeller blades or vanes are formed from sections of flexible material such as Teflon, as designated at 222. These sections have intermediate portions of narrowed lateral extent, as designated at 224. These portions are positioned within the tube 154' straddling segments of the tube between slots as shown and then small rods, such as shown at 226, are inserted between the webs 224 and the adjacent segments between slots 220. Then an end cap 230 is soldered to the end of the tube 154'.

FIGS. 9 and 10 show another modified form of impeller assembly, in which the blade members 222' have a greater axial dimension and the assembly being otherwise like that of FIGS. 6, 7 and 8. Carried on the tube 154' is a retainer-washer or spider 232. There is an intermediate slot shown at 234 between the halves or parts of the material forming the blades as shown, and the edges of the slot are notched out as shown at 236. Peripheral portions of the disc retainer 232 fit into these notches as shown.

From the foregoing, those skilled in the art will readily understand the nature and construction of the invention, its operation, and the manner in which it achieves and realizes all of the objects and advantages as set forth in the foregoing.

The foregoing disclosure is representative of preferred forms of the invention, and is to be interpreted in an illustrative rather than a limiting sense.

What is claimed is:

1. As an article of manufacture a stirring device particularly adapted for stirring foods comprising a motor and a shaft driven thereby, a stirring impeller driven by the shaft, and means whereby to suspend the motor and impeller over a vessel in which stirring is to take place in a manner to provide for adjustments suited to the depth of the vessel and whereby to center the stirring impeller in the vessel, said suspension means comprising means attachable to the peripheral of a vessel in which stirring is to take place, a supporting member from which the motor and mixing impeller are suspended, and means to adjust the angular position of said member whereby to center the impeller in the vessel in which stirring is taking place, said adjustable means comprising a fixed, toothed, arcuate member, said supporting member being mounted for rotation at the center of said toothed member, and detent means cooperable with the toothed member for setting said member in various angular positions.

2. An article as in claim 1, wherein said adjustable means are heat insulated from the vessel in which stirring is taking place.

3. As an article of manufacture a stirring device particularly adapted for stirring foods comprising a motor and a shaft driven thereby, a stirring impeller driven by the shaft, and means whereby to suspend the motor and impeller over a vessel in which stirring is to take place in a manner to provide for adjustments suited to the depth of the vessel and whereby to center the stirring impeller in the vessel, a support for the device and a flexible buffer means attached to the said support to act as a fender to prevent the mixing impeller being obstructed by said support.

4. As an article of manufacture a stirring device particularly adapted for stirring foods comprising a motor and a shaft driven thereby, a stirring impeller driven by the shaft, and means whereby to suspend the motor and impeller over a vessel in which stirring is to take place in a manner to provide for adjustments suited to the depth of the vessel and whereby to center the stirring impeller in the vessel, said suspension means comprising means attachable to the peripheral edge of a vessel in which stirring is to take place, and a supporting member from which the motor and mixing impeller are suspended and means to adjust the angular position of said member whereby to center the impeller in the vessel in which stirring is to take place, said motor and stirring impeller being suspended by the suspension means in the manner of a pendulum.

5. As an article of manufacture a stirring device particularly adapted for stirring foods comprising a motor and a shaft driven thereby, a stirring impeller driven by the shaft, and means whereby to suspend the motor and impeller over a vessel in which stirring is to take place in a manner to provide for adjustments suited to the depth of the vessel and whereby to center the stirring impeller in the vessel, said suspension means comprising means attachable to the peripheral edge of a vessel in which stirring is to take place, and a supporting member from which the motor and mixing impeller are suspended and means to adjust the angular position of said member whereby to center the impeller in the vessel in which stirring is to take place, said stirring impeller comprising blades made of flexible material to prevent damage to the vessel in which mixing is to take place or obstruction of the impeller, said blades comprising sections of material fitted into axial slots in a tubular driving stem with retaining means holding the material in the slots.

* * * * *